A. POTDEVIN.
INTERNAL COMBUSTION ENGINE.
APPLICATION FILED JAN. 4, 1911.

1,010,798.

Patented Dec. 5, 1911.
4 SHEETS—SHEET 1.

WITNESSES

INVENTOR
Adolph Potdevin
BY
ATTORNEY

A. POTDEVIN.
INTERNAL COMBUSTION ENGINE.
APPLICATION FILED JAN. 4, 1911.

1,010,798.

Patented Dec. 5, 1911.
4 SHEETS—SHEET 3.

WITNESSES
B. Chandler Snead
M. B. Grewey

INVENTOR
Adolph Potdevin
BY
John F. Nolan
ATTORNEY

A. POTDEVIN.
INTERNAL COMBUSTION ENGINE.
APPLICATION FILED JAN. 4, 1911.

1,010,798.

Patented Dec. 5, 1911.
4 SHEETS—SHEET 4.

WITNESSES
B. Chandler
M. B. Gowey

INVENTOR
Adolph Potdevin
BY
John F. Nolan
ATTORNEY

# UNITED STATES PATENT OFFICE.

ADOLPH POTDEVIN, OF BROOKLYN, NEW YORK, ASSIGNOR TO POTDEVIN MACHINE COMPANY, OF BROOKLYN, NEW YORK, A CORPORATION OF NEW YORK.

INTERNAL-COMBUSTION ENGINE.

1,010,798.   Specification of Letters Patent.   Patented Dec. 5, 1911.

Application filed January 4, 1911. Serial No. 600,699.

*To all whom it may concern:*

Be it known that I, ADOLPH POTDEVIN, a citizen of the United States, and resident of Brooklyn, in the county of Kings and State of New York, have invented certain new and useful Improvements in Internal-Combustion Engines, of which the following is a specification.

This invention relates to internal combustion engines, and particularly to the two-cycle type; my object being to provide a simple and reliable engine of high efficiency. To this end I construct the engine cylinder with inlet and exhaust ports which are correlated with each other and with the explosion and exhaust chambers and are directly controlled by the piston in such manner that the expulsion of the products of combustion from, and the distribution of the fresh charge of gas within, the explosion chamber, are efficiently attained, as will be hereinafter fully described and claimed.

Figure 1:
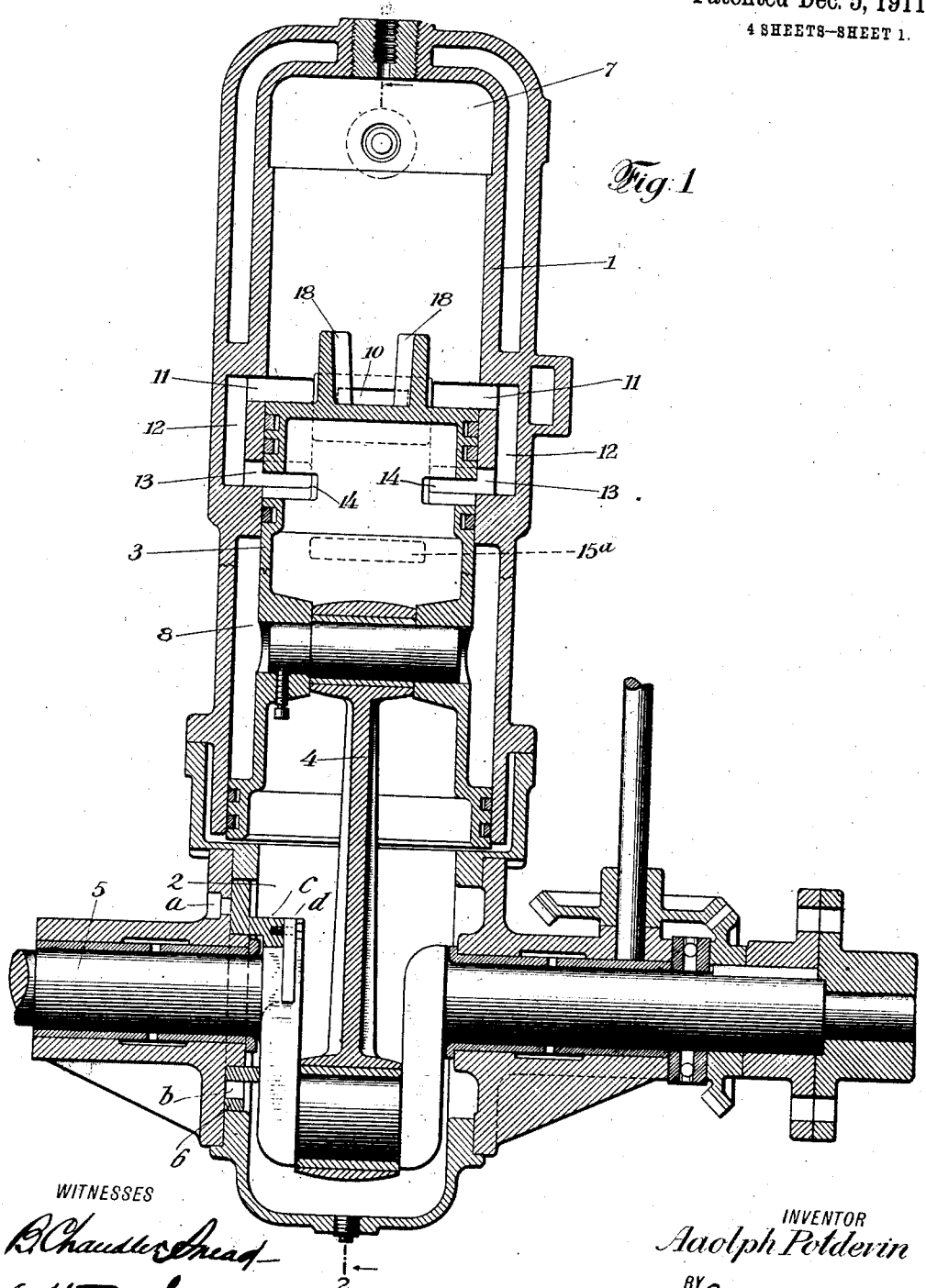
Figure 2:
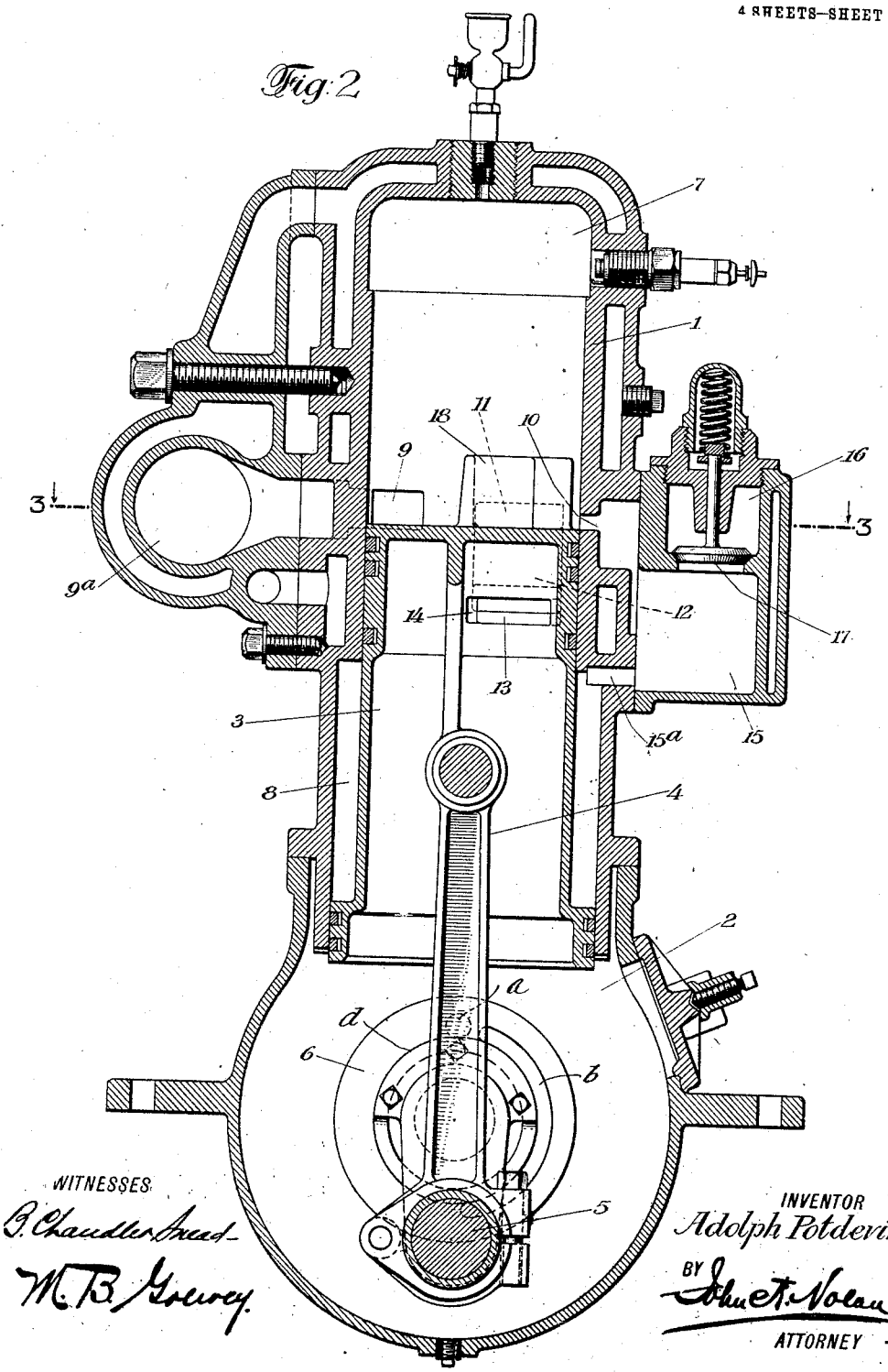
Figure 3:
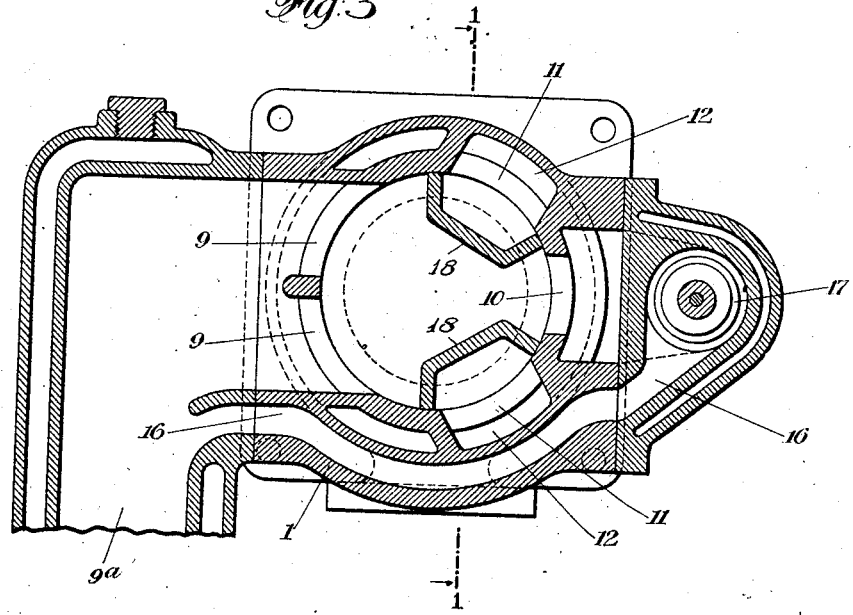
Figure 4:
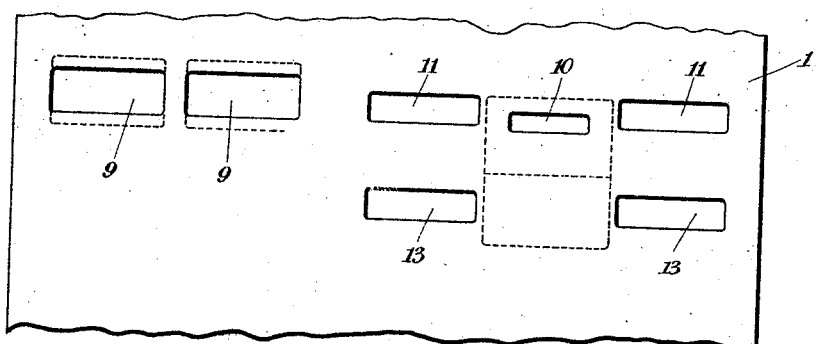
Figure 5:
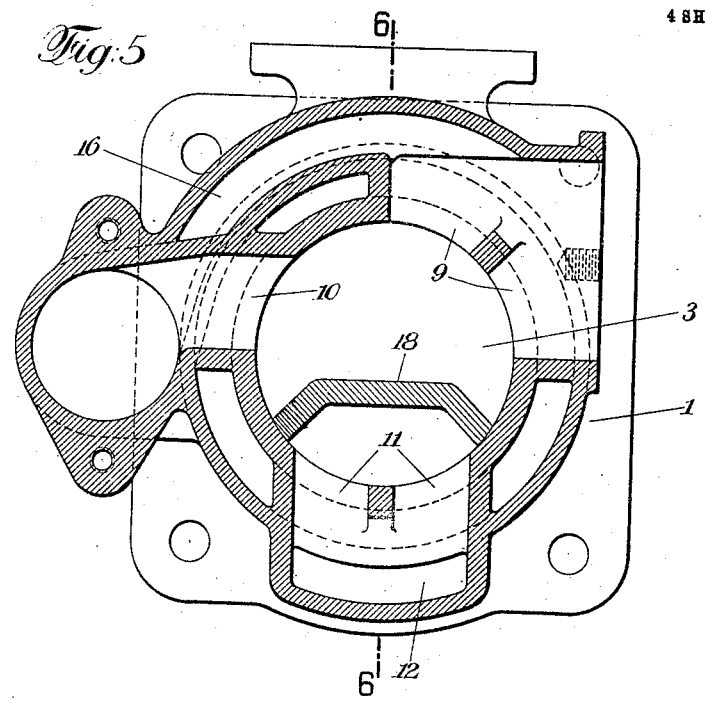
Figure 6:
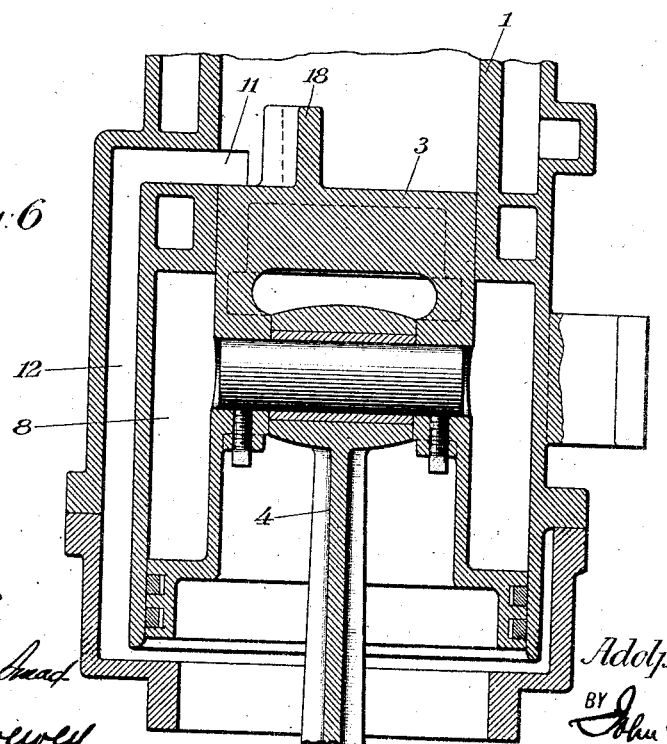

In the drawings—Figure 1 is a vertical section of an engine embodying my invention, the piston being shown at the limit of its down or power stroke. Fig. 2 is a similar section, as on the lines 2—2 of Figs. 1 and 3. Fig. 3 is a horizontal section, as on the line 3—3 of Fig. 2. Fig. 4 is a partial development of the interior of the cylinder showing the relative positions and areas of the inlet and exhaust ports. Fig. 5 is a section similar to Fig. 3, showing a slightly modified arrangement of said ports. Fig. 6 is a partial vertical section, as on the line 6—6 of Fig. 5.

1 is the cylinder; 2 the compression chamber, 3 the piston; 4 the piston rod; 5 the crank shaft, and 6 the valve for controlling the gas supply port $a$ to the compression chamber; all these parts being so constructed and arranged that as the piston is driven upward a new charge of gas is supplied to the compression chamber as usual. The valve is herein represented as seated in the wall of the crank case, and provided with a segmental port $b$ which periodically registers with the supply port $a$. This valve is annular in form and is provided with a segmental flange $c$ which is secured to a similar flange $d$ on the crank so as to be rotated by the latter.

The explosion chamber 7 is formed in the upper portion of the cylinder, and the supplementary exhaust chamber 8 is formed between the lower expanded portion of the cylinder and the flanged piston; a partial vacuum being created in said chamber 8 during the down or power stroke of the piston and being utilized as an auxiliary factor to effect and insure the complete expulsion of the waste gases from the explosion chamber. During the upward stroke of the piston the waste gases are discharged from the exhaust chamber.

The present improvement particularly concerns the arrangement of the inlet and exhaust ports with relation to the combustion and exhaust chambers and to the piston, whereby the said ports are progressively opened directly by the piston (without the aid of supplementary valves) as the piston approaches and reaches the limit of its down or power stroke, and are correspondingly closed in reverse order by the piston during its up or return stroke, as will now be described.

9 indicates the primary exhaust ports; 10 the secondary exhaust port, and 11 the gas inlet ports, two of the last-named ports being preferably employed and being disposed on opposite sides of the cylinder. Each of the gas inlet ports is connected by means of a by-pass 12 with a lower port 13 with which a corresponding port 14 formed in the wall of the piston is adapted to register as and when the piston reaches the limit of its down stroke.

The primary exhaust ports lead directly to the exhaust pipe $9^a$ as usual, and the secondary exhaust port communicates through a passage 15 and port $15^a$ with the annular chamber 8, the said passage being also in communication with a lateral duct 16 leading to the exhaust pipe. The communication between the passage 15 and the duct 16 is controlled by an ordinary puppet valve 17.

Suitably disposed on the head of the piston are vertical baffle plates 18 which, when the piston is in its lowermost position, lie in front of and extend somewhat above the respective inlet ports 11. When the piston occupies that position its upper edge is in the same horizontal plane, or substantially so, as the lower edges of the several ports 9, 10 and 11, and hence all said ports are fully open. These ports, as most clearly illustrated in Fig. 4, are of progressively varying heights or areas, that is, the main exhaust ports 9 extend above the inlet ports 11, and the latter ports extend above the secondary exhaust port 10. Hence as the piston approaches the limit of its down or power stroke, it first partially opens the main exhaust ports; then the two inlet ports, and finally the secondary exhaust port. Consequently when the piston has completed its down or power stroke all the ports are fully open. In the descent of the piston a partial vacuum is created in the chamber 8 as above mentioned; the sequence of the operations being as follows: The waste gases first proceed to escape from the explosion chamber through the main exhaust ports 9; the new charge then proceeds to enter the said chamber through the inlet ports 11 and is deflected upwardly by the baffles, which new charge assists the expulsion of the waste gases by way of the main exhaust ports; the secondary exhaust port 10 is finally opened and by the action of the vacuum in the chamber 8 the remaining products of combustion in the explosion chamber are completely withdrawn therefrom and the efficient inflow thereto of the new charge is facilitated. When the piston ascends the products of combustion are expelled from the exhaust chamber by way of the port 15a and passages 15 and 16 to the exhaust.

By the novel arrangement of the inlet and exhaust ports and the correlation therewith of the piston and co-acting parts, as hereinbefore described, a very simple and reliable two-cycle engine of high efficiency is produced. It is to be particularly noted that the piston itself, without the aid of extraneous or separate valves, effects and controls the timely operation of the several ports, and that therefore there is no liability of their faulty operation during the running of the engine.

I do not limit my invention to the specific details of construction hereinbefore described, as the structure may be variously modified without departure from the fair spirit of the invention; for example, in Figs. 5 and 6 is shown a modification wherein the inlet ports are arranged adjacent to each other and in communication with a single by-pass 12, and a single baffle plate 18 to deflect the charge therefrom is provided on the piston, and wherein the piston port is omitted and the by-pass for the transmission of the gaseous mixture to the explosion chamber is extended to a point below the piston.

I claim—

1. In an internal combustion engine of the two-cycle type, the combination with a piston, of a cylinder therefor having an explosion chamber and an exhaust chamber, the former chamber having therein primary and secondary exhaust ports and a gas inlet port, the secondary port communicating with the exhaust chamber and the several ports being of progressively increasing areas, whereby the piston itself in its outer or power stroke first partially opens the primary exhaust port, then the gas inlet port, and then the secondary exhaust port, all the said ports being fully open when the piston reaches the limit of its said stroke.

2. In an internal combustion engine of the two-cycle type, the combination with a piston, of a cylinder therefor having an explosion chamber and an exhaust chamber, the latter chamber being formed between the wall of the cylinder and the piston, and the former chamber having therein primary and secondary exhaust ports and a gas inlet port, the secondary port communicating with the exhaust chamber and the several ports being of progressively increasing areas, whereby the piston itself in its outer or power stroke first partially opens the primary exhaust port, then the gas inlet port, and then the secondary exhaust port, all the said ports being fully open when the piston reaches the limit of its said stroke.

3. In an internal combustion engine of the two-cycle type, the combination with a piston, of a cylinder therefor having an explosion chamber and an exhaust chamber, the latter chamber being formed between the wall of the cylinder and the piston during the power stroke of the piston, and the former chamber having therein primary and secondary exhaust ports and a gas inlet port, the secondary port communicating with the exhaust chamber and the several ports being of progressively increasing heights or areas and having their lower edges in the same plane, or substantially so, as the head of the piston when it is at the limit of its said stroke, whereby the piston itself in such stroke first partially opens the primary exhaust port, then the gas inlet port, and then the secondary exhaust port, all the said ports being fully open when the piston reaches the limit of its said stroke.

4. In an internal combustion engine of the two-cycle type, the combination with a piston, of a cylinder therefor having an explosion chamber and an exhaust chamber, the latter chamber being formed between the wall of its cylinder and the piston during the power stroke of the piston, and the former chamber having therein primary and secondary exhaust ports and a gas inlet port, the secondary port communicating with the exhaust chamber and the several ports being of progressively increasing heights or areas and having their lower edges in the same plane, or substantially so, as the head of the piston when it is at the limit of its said stroke, whereby the piston itself in its said stroke first partially opens the primary exhaust port, then the gas inlet port, and then the secondary exhaust port, all the said ports being fully open when the piston reaches the limit of its down stroke, the said cylinder also having a by-pass leading from the inlet port, and the said piston also having a port adapted to register with said by-pass when the piston reaches the limit of its down stroke, together with a baffle located on the piston adjacent the said inlet port.

Signed at borough of Brooklyn, N. Y., in the county of Kings and State of New York this 13th day of December A. D. 1910.

ADOLPH POTDEVIN.

Witnesses:
    HENRY G. PONS,
    EDWARD RODGERS.